United States Patent [19]

Pauly

[11] Patent Number: 4,700,148

[45] Date of Patent: Oct. 13, 1987

[54] SHAKER TABLE AMPLIFIER

[75] Inventor: Wayne Pauly, Newport Beach, Calif.

[73] Assignee: Ling Electronics, Inc., Latham, N.Y.

[21] Appl. No.: 855,492

[22] Filed: Apr. 23, 1986

[51] Int. Cl.$^4$ .................. G01M 7/00; H02K 33/00; H02P 5/00

[52] U.S. Cl. .................. 331/154; 73/664; 318/128

[58] Field of Search .................. 331/154; 73/664; 318/114, 127, 128

[56] References Cited

U.S. PATENT DOCUMENTS

| | | | |
|---|---|---|---|
| 3,486,094 | 12/1969 | Zane | 318/128 |
| 4,309,675 | 1/1982 | Rabe | 318/127 X |
| 4,577,164 | 3/1986 | Grib | 318/128 X |

Primary Examiner—Eugene R. LaRoche
Assistant Examiner—David Mis
Attorney, Agent, or Firm—Joseph V. Claeys; Joseph C. Sullivan

[57] ABSTRACT

A solid state amplifier for driving a shaker is described. The amplifier is comprised of a circuit which generates a pulse-width modulated drive signal for driving an armature of a shaker. The circuit includes an oscillator, power supply, wave-shaping generator, error detection network, comparator modulator and drive amplifiers. The oscillator generates a base waveform which is shaped by the wave-shaping generator. This signal is compared with error signals and the resulting signal is used to provide the pulse-width modulated driving signal to the shaker.

30 Claims, 5 Drawing Figures

SHAKER TABLE AMPLIFIER

BACKGROUND OF THE INVENTION

The present application has been filed concurrently with U.S. patent application, Ser. No. 855,587, filed Apr. 23, 1986, and assigned to the Assignee of the present application.

1. Field of the Invention:

The present invention relates to the field of electronic power amplifiers, and more, specifically to power amplifiers for driving a shaker.

2. Prior Art:

There are a considerable number of "shakers" that are well-known in the prior art. These shakers are used to mechanically shake an item for the purpose of diagnostically testing responses to certain driving forces. The item is physically attached to a moving portion of the shaker and when the shaker is activated, the item is subjected to a variety of test conditions. The moving portion of the shaker is typically driven by a force which may be continuous, cyclical or impulsed.

One class of these shakers employ the use of an electromagnetic field between field and armature windings. Various driving signals are impressed across the armature winding to control the movement of the shaker. A variety of sensing devices are also employed to provide feedback to the main control unit. To drive this type of a shaker, a power supply is needed to provide electrical power to the field and armature windings. Typically, the voltage on one winding (the field winding) is kept constant while the other winding (the armature winding) is driven by a varying signal which then varies the electro-magnetic field for moving the shaker.

In the prior art, shaker power supplies were custom designed for a particular shaker, or in many instances, the nearest acceptable unit meeting the shaker requirement was configured for use. Further, many prior art shaker power supplies did not provide the precise electronic controls for closely monitoring and controlling the electrical drive of the shaker.

As will be disclosed, the present invention provides a shaker power source which is readily adaptable to meet most armature type shaker power requirements, and also provide precise control over the electrical drive of the shaker.

SUMMARY OF THE INVENTION

A solid state power amplifier for a shaker is described. A plurality of power modules are coupled to a power source and to an armature winding of an electrically driven shaker. The power modules function as a switching device by modulating a DC input from the power source and generating a modulated drive signal to the shaker. The power modules are comprised of a plurality of individual modules which may be inserted or removed depending on the maximum power requirements of the shaker. Each of these pluggable power modules includes a plurality of MOSFET (Metal-Oxide Semiconductor Field Effect Transistor) switches operating as a full-wave bridge.

A modulator receives feedback signals from the shaker and the power modules. The modulator then provides the necessary control signals to the power modules to properly modulate the drive to the shaker. The modulator is comprised of an oscillator, drive power supply, triangle generator, feedback-error network, comparators and modulator drivers. The oscillator provides the bases for a 56 KHz driving signal which powers the drive power supply and the triangle generator. The comparators compare the feedback signals, which are inputed to the feedback-error network, to the modulated signal of the triangle generator. The output of the comparators are inputted to the modulator drivers which drive the power modules.

DETAILED DESCRIPTION OF THE PREFERRED EMBODIMENT

A solid state power amplifier for a shaker is described. In the following description numerous specific details are set forth such as specific electronic components, switches, signal and control lines, power sources, etc. in order to provide a thorough understanding of the present invention. However, it will be apparent to one skilled in the art that the present invention may be practised without these specific details. In other instances, well-known circuits and devices are shown in minimal representation in order not to unnecessarily obscure the present invention.

Figure 1:
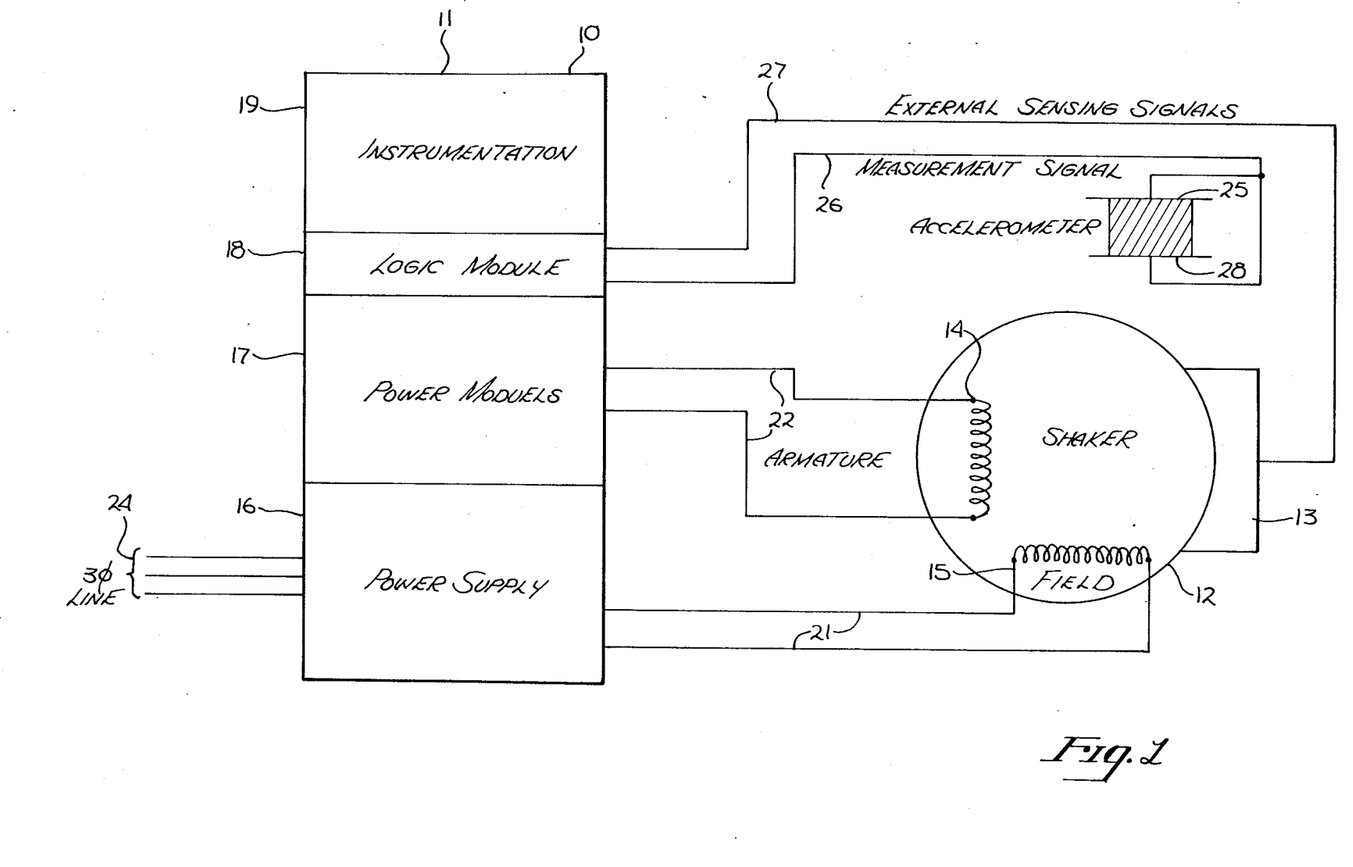
FIG. 1 is a block diagram showing an application of the present invention as a power source for a shaker.

Referring to FIG. 1, a power amplifier 10 is shown residing within an equipment cabinet 11. A shaker 12 and its housing 13 is shown removed some distance from the amplifer 10. In most applications, shaker 12 is located within an enclosed area for the purpose of protecting amplifier 10 and operating personnel from an item under test, although such requirement is optional. Shaker 12 contains an armature winding 14 and a field winding 15. Shaker 12, including the two windings 14 and 15, may be any of a variety of prior art shakers that are electrically driven.

Amplifier 10 is comprised of a power supply section 16, power module section 17, logic module section 18 and an instrumentation section 19. Power supply section 16 directly provides power to field windings 15 on lines 21 and indirectly provides power to armature windings 14 on lines 22. A three phase line input on lines 24 to power supply section 16 provides the input power to the amplifier 10.

Power module section 17 operates as a switching device by modulating the armature power from power supply section 16 onto armature lines 22. Switching controls of power modules section 17 are directed by control signals from a logic module section 18.

Logic module section 18 is coupled to shaker measurement device 25 on line 26 and to various external sensing devices located external to cabinet 11 by line 27. Also, any adjustment devices, such as potentiometers, for setting various control levels are located on logic module section 18. In the preferred embodiment, an accelerometer 28 is used to measure the movement of shaker 12, however, any number or type of prior art devices may be used for such device 25. Line 27 is shown as a single line carrying external sensing signals from shaker 12 and housing 13, but it will be appreciated that any number of lines can readily be used. Sensing signals emanate from devices (not shown) such as interlocks, blower switches, over voltage sensors, etc., which provide monitoring of the environment.

Instrumentation section 1 houses testing instruments which may be used for a variety of purposes well known in the prior art. It will be noted that instrumentation section 19 is not necessarily for practicing the present invention, and is provided strictly for reference in regards to the cabinet 11 layout of the preferred embodiment. Although the preferred embodiment is shown to have a particular configuration within a unitary cabinet 11, the configuration is arbitrary and multiple cabinets may be used as well. Also, like reference numerals are used on the different drawings in which like reference numerals refer to the same parts throughout the several views.

Figure 2:
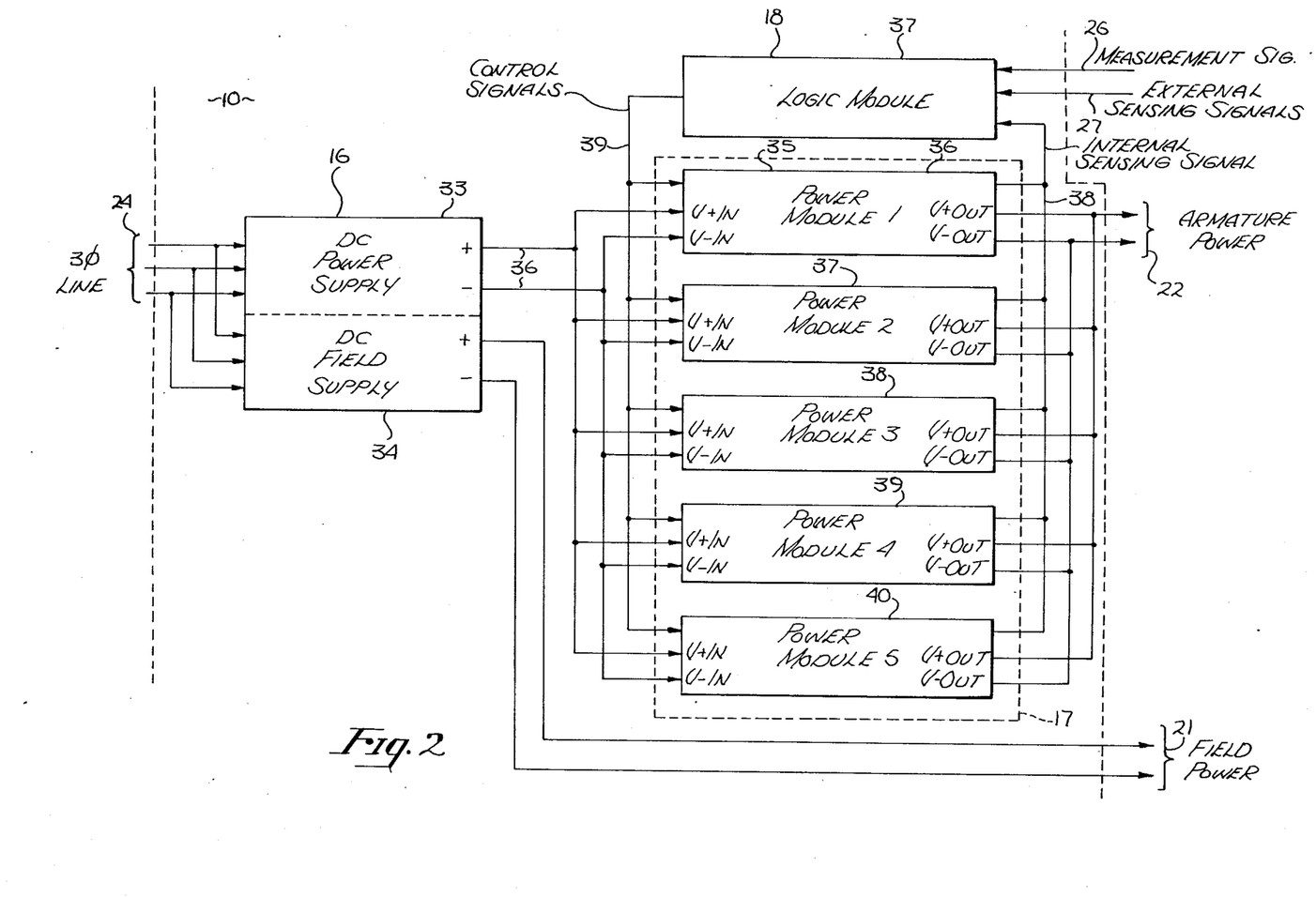
FIG. 2 is a more detailed block diagram showing power supplies, power modules and a logic module of FIG. 1.

Referring to FIG. 2, a block diagram of amplifier 10 is shown with pertinent control and power lines. Three phase input lines 24 are coupled to power supply section 16 which is comprised of a DC supply 33 and DC field supply 34. Field supply 34 provides field power directly onto lines 21. DC power supply 33 indirectly provides the drive for armature power on line 22 by providing power to section 17. Although the type and value of the supplies 33 and 34 depend on the shaker, the preferred embodiment sources 170 volts DC unregulated for supply 33 and 440 volts DC for field supply 34.

Power module section 17 is further divided into individual power modules 35. Each power module 35 accepts DC power from supply 33 as V+in and V−in on lines 36. Each power module 35 provides a switching function by modulating the voltage on lines 36 at a modulating frequency determined by a control signal from logic module 18. The modulated output, V+out and V−out from each module 35 is coupled in parallel to provide armature power on line 22.

Each power module 35 is separate self-contained unit which may be inserted or deleted as required by the power requirements of a specific shaker and its configuration. Each power module 35 is designed with a plug capability which allows each module 35 to be placed in parallel, as shown in the drawing of FIG. 2. The preferred embodiment utilizes up to five power modules 36-40 in parallel such that each module 45 is capable of providing a peak current of 100 amperes for a total current capability of 500 peak amperes when all power modules 36-40 are used. Although the preferred embodiment is shown to use from 1-5 power modules 35, more may be added in parallel without deviating from the spirit and scope of the invention.

Logic module section 18 includes a modulator 37 which receives measurement and sensing signals on lines 26 and 27, as well as sensing signals from the power modules 36 through 40 on line 38. Modulator 37 generates control signals on line 39 which provides the pulse width modulation for switching the voltage in power modules 36 through 40.

For simplicity, other power and control lines well-known in the prior art which are needed for proper operation of the amplifier 10 are not shown. Power modules 36-40 are operated in a class D mode utilizing a principle of pulse-width modulation to amplify power.

Further, although FIG. 1 illustrates the present invention driving an electromagnetically driven shaker, the present invention also operates to drive electro-pneumatic transducers which produce acoustically induced vibrations. The present invention provides the necessary electrical drive for electrically driven shake apparatus.

Power Module

Figure 3:
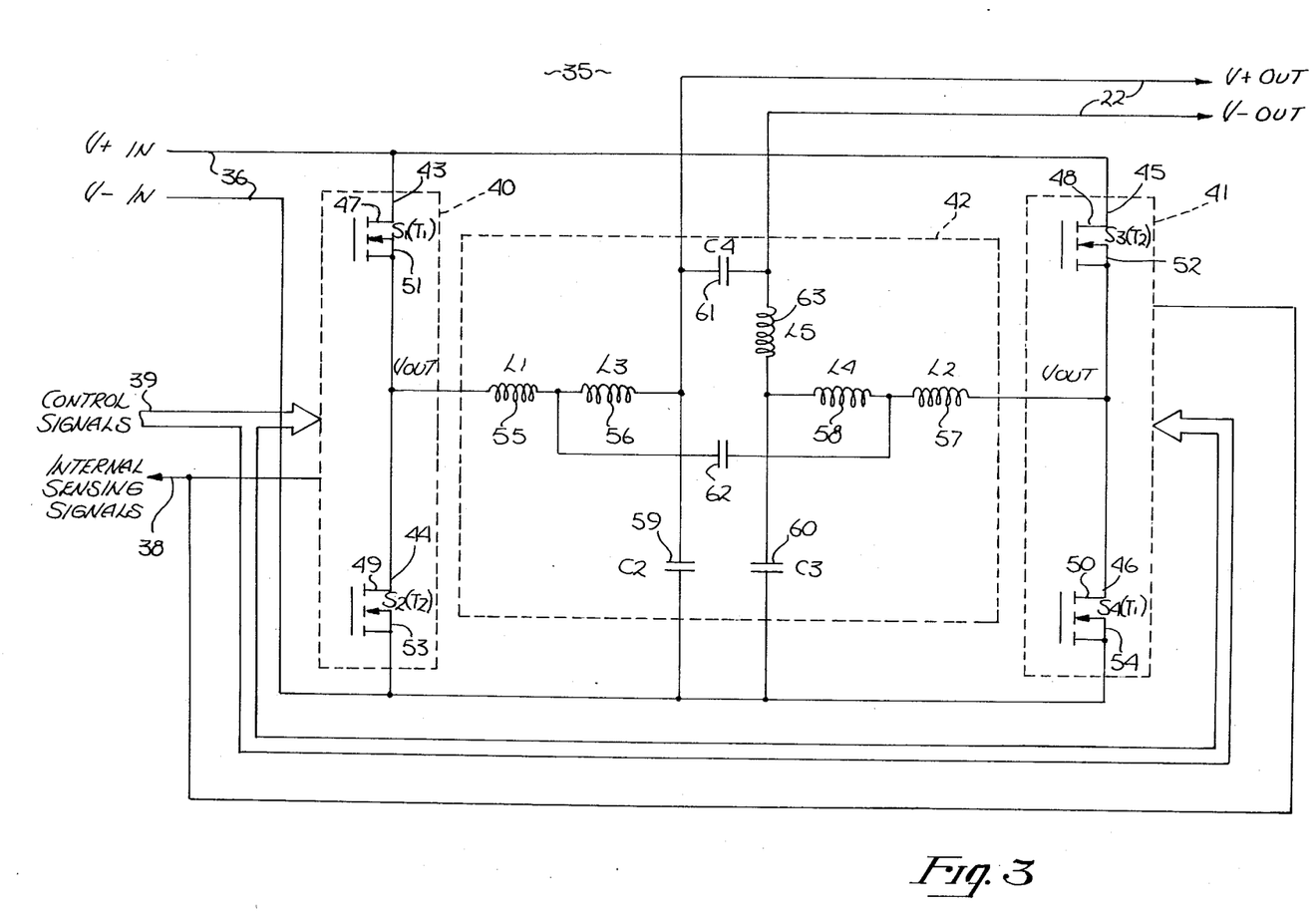
FIG. 3 is a schematic diagram of a power module.

A power module 35 of FIG. 2 is shown in FIG. 3 in more detail. Each module 35 is a high-frequency pulse-width modulated power converter comprising of two half-wave bridge circuits 40 and 41 and a filter circuit 42. Switches 43 and 44 (S1 and S2) of circuit 40 and switches 45 and 46 (S3 and S4) of circuit 41 are configured as a full-wave switch. Filter circuit 42 provides the filtering of the output of the switches 43-46.

Switches 43-46, as used in the preferred embodiment, are power MOSFETs (Metal-Oxide Semiconductor Field Effect Transistor), although other devices may be readily used. Drains 47 and 48 of switches 43 and 45 are coupled to V+in, while the sources 53 and 54 of switches 44 and 46 are coupled to V−in. A drain 49 of switch 44 and source 51 of switch 43 are coupled to a first side of inductor 55 (L1). A drain 50 of switch 46 and source 52 of switch 45 are coupled to a first side of inductor 57 (L2). A second side of inductor 55 is coupled to a first side of inductor 56 (L3), and also to a first side of capacitor 62 (C1). A second side of inductor 56 is coupled to V+out. Similarly, a second side of inductor 57 is coupled to a first side of inductor 58 (L4) and to a second side of capacitor 62. A second side of inductor 58 is coupled to a first side of inductor 63 (L5). A second side of inductor 63 is coupled to V−out. Further, capacitor 61 (C4) is placed between V+out and V−out, capacitor 59 (C2) is placed between V+out and V−in, and capacitor 60 (C3) is placed between the first side of inductor 63 and V−in.

The clocking of switches 43-46 is determined by control signals on line 39. Functionally, switches 43 and 46 (S1 and S4) are activated together during one time period (as shown by T1) and switches 44 and 45 (S2 and S3) are activated together during a second time period (as shown by T2). The control signals on line 39 provide gating control and determine the duty cycle times of switches 43-46. By varying the duty cycles T1 and T2 of switches 43 through 46, a variety of modulated V+out and V−out driving voltages are available on line 22. Typically, duty cycle of T2 is the inverse of duty cycle T1. Further, a variety of sensing signals, such as over-voltage and over-current signals, are generated within circuits 40 and 41 and are sent out on internal sensing line 38.

Circuit 42 provides three levels of filtering for filtering unwanted switching frequencies. Inductors 55 and 57 and capacitor 62 remove the bulk of the noise energy using a differential mode filtering. The common mode energy is transferred back into the power supply via common mode inductors 56 and 58 and capacitors 59 and 60. Any remaining noise is removed by a second stage differential filter comprised of inductor 63 and capacitor 61.

Figure 4:
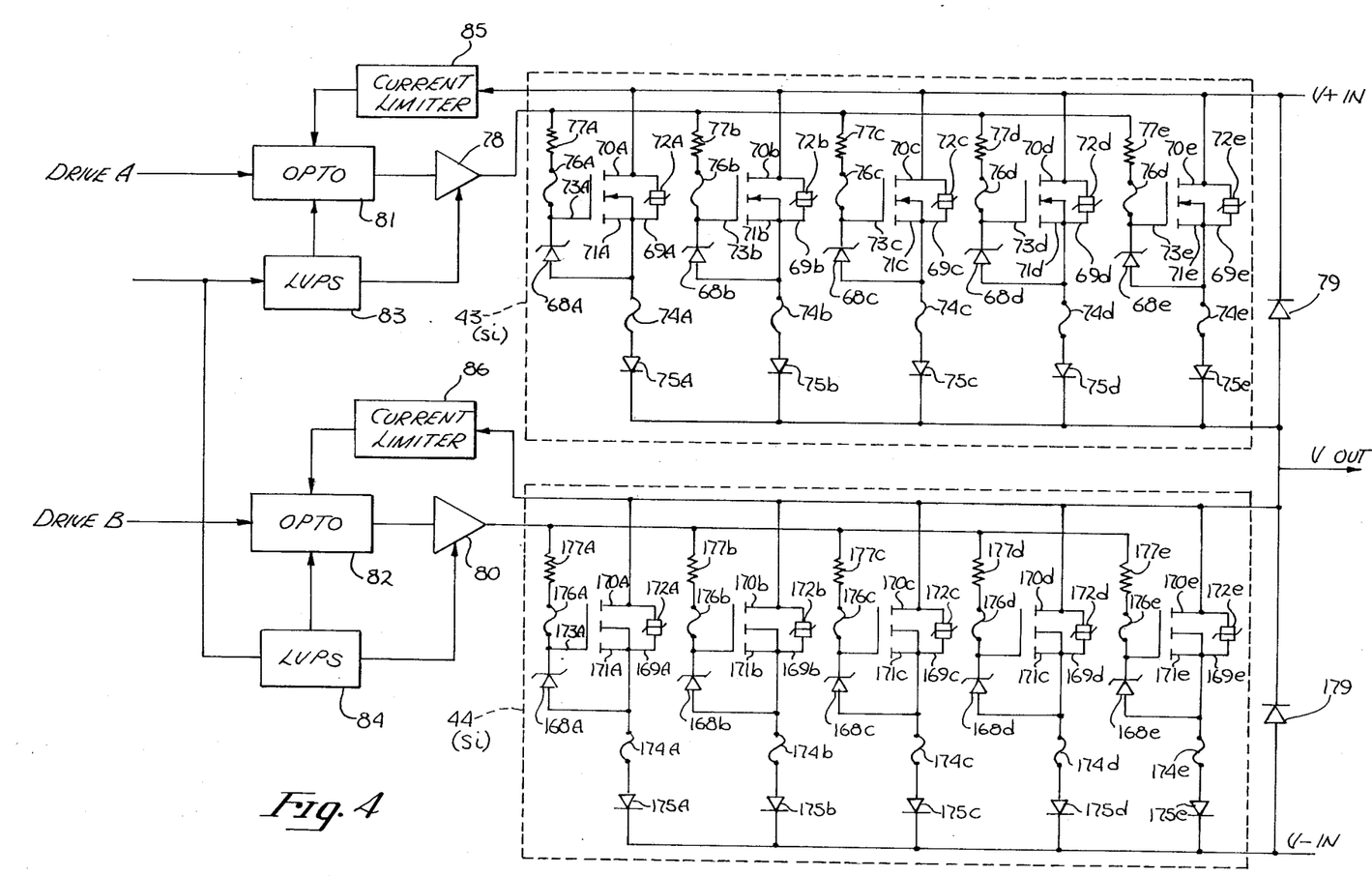
FIG. 4 is a schematic diagram of a half-wave bridge circuit of FIG. 3.

FIG. 4 is a detailed schematic diagram of the half-wave bridge circuit 40 of FIG. 3. The same circuit is duplicated in circuit 41. Switch 43 (S1) of FIG. 3 is depicted within the upper box formed by the dotted line. Switch 44 (S2) of FIG. 3 is depicted within the lower dotted box. Although switch 43 is shown to be a single switch in FIG. 3, in actuality, the preferred embodiment uses a plurality of MOSFETs in parallel. The preferred embodiment utilizes five MOSFETs 69a–e, and because each MOSFET circuitry is identical, the description will only be given to one using a general reference label (such as MOSFET 69). A drain 70 is coupled to V+in. Source 71 is coupled to a first side of fuse 74 and an anode side of zener diode 68. A second side of fuse 74 is coupled to anode of diode 75 and cathode of diode 75 is coupled to Vout. Gate 73 of MOSFET 69 is coupled to cathode of zener diode 68 and a first side of fuse 76. Second side of fuse 76 is coupled to a first side of resistor 77 and a second side of resistor 77 is coupled to output of amplifier 78. Varistor 72 is coupled between the source 71 and drain 70. In the parallel configuration, the cathodes of diodes 75a–e are coupled together to Vout and second sides of resistors 77a–e are coupled together to output of amplifier 78. Components 68, 72, 74, 75, 76 are used to protect each individual MOSFET such that if one MOSFET fails the protection will prevent the failed MOSFET from effectively shorting across the other parallel set of MOSFETs. Diode 68 and varistor 72 protect the MOSFET 69 from voltage transients.

This circuitry of switch 44 (S2) is identical to that of switch 43. Switch 44 is comprised of five power MOSFETs circuitry as in switch 43. Because the function of the circuitry is identical, a prefix 1 has been added to the numbering scheme of switch 43, however the operation and function of the circuitry is equivalent to that of switch 43. Therefore, drain 170 of MOSFET 169 corresponds to drain 70 of MOSFET 69. In this instance, cathodes of diode 175a–e are coupled together to V−in and a second side of resistor 177a–e are coupled together to the output of amplifier 81. Drains 70a–e are coupled together to Vout, which is coupled to filter 42 of FIG. 3. Externally to switch 43, a diode 79 is placed between V+in and Vout, wherein a cathode side is coupled to V+in and anode side is coupled to Vout. Similarly, a cathode side of diode 179 is coupled to Vout and an anode side is coupled to V−in. Diodes 79 and 179 provide protection of switch 43 and 44, respectively.

Modulating signal A is inputted to optical coupler 81 which is then coupled to the input of driver amplifier 78. Modulating signal B is inputted to optical coupler 82 wherein the output of optical coupler 82 is coupled to input of driver amplifier 80. A 56 KHz square wave is inputted to the input of low voltage power supplies 83 and 84. Low voltage power supply 83 provide the necessary voltages to operate optocoupler 81 and amplifier 78. Low voltage power supply 84 provides similar voltages to optocoupler 82 and amplifier 80. The low voltage power supplies 83 and 84 of the preferred embodiment is a full-wave rectifier utilizing a filter and a regulator at the output. Further, current limiters 85 and 86 provide over current protection for switches 43 and 44. Current limiter 85 coupled to drains 70a–e monitor the amount of current through MOSFET 69a–e. When an overcurrent exists in switoh 43, it wiH be manifested as an excessive voltage drop across switch 43. Current limiter 85 then provides a feedback signal to optocoupler 81 wherein optocoupler 81 is inhibited at a repeated rate of 5 KHz as long as the overcurrent condition exists. Current limiter 86 coupled to drains 170 also provide similar overcurrent protection for switch 44. The output of current limiter 86 provides a feedback signal to optocoupler 82 wherein the overcurrent protection provided is equivalent to that of optocoupler 81 and current limiter 85. In the preferred embodiment, current limiters 85 and 86 employ a simple multi-vibrator to switch ar a repeated 5 KHz rate when overcurrent condition is sensed, wherein the 5 KHz disables the 56 KHz activation signal.

Logic Module Modulator

Figure 5:
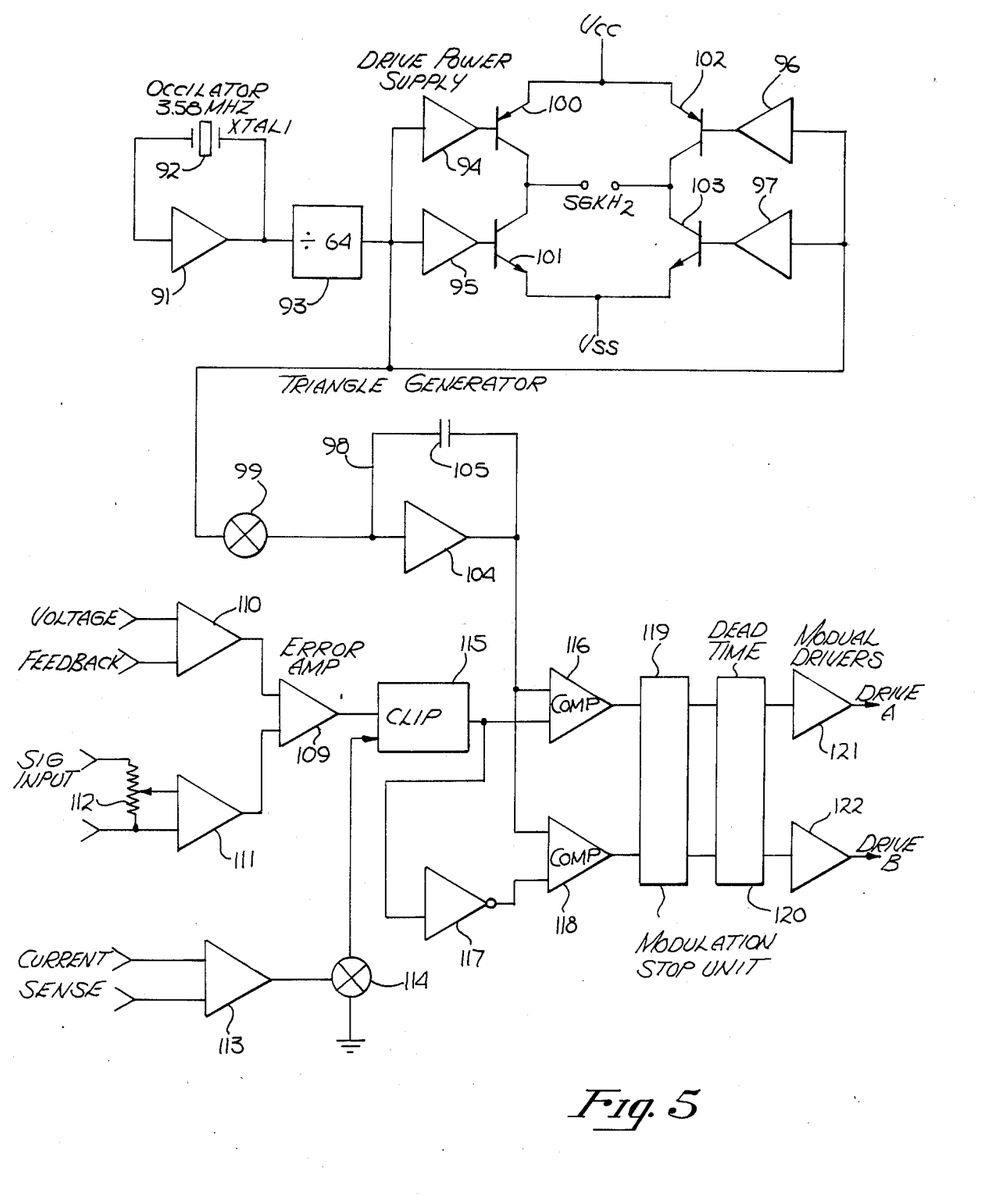
FIG. 5 is a schematic diagram of a modulator.

The modulator 37 of logic module section 18 of FIGS. 1 and is shown as a schematic diagram in FIG. 5. An oscillator comprised of crystal 92 and amplifier 91 generates a 3.58 MHz signal which is then divided by a factor of 64 by divider 93. The output of divider 93 is a 56 KHz square wave which is then fed to the input of amplifiers 94–97. The output of amplifiers 94–97 are each coupled to the bases of transisters 100–103, respectively. The emitters of transisters 100 and 102 are coupled to +Vcc and the emitters of transisters 101 and 103 are coupled to −Vss. The collector of transister 100 and collector of transister 101 are coupled together and the collector of transister 102 and 103 are coupled together. The output of the paired collectors of transistors 100–103 provide a 56 KHz output of which one output is coupled to the low voltage power supplies 83 and 84 of FIG. 4. Transistors 100–103 provides a square wave power drive of the 56 KHz signal.

The output of divider 93 is also coupled to the input of amplifier 104 through adjustment device 99. A capacitor 105 is coupled between the input and output of amplifier 104 to form a precision integrator. Triangle generator 98 converts the 56 KHz signal to a precision triangle signal, the exact shape determined by device 99. Device 99 may be any automatic or manual adjustment device, such as a trim potentiometer, for adjusting the pulse width or amplitude or 56 KHz signal. The triangle generator 98 of the preferred embodiment is a constant current source which produces a precision triangle signal. The output of the triangle generator is then coupled to a first input to each of the pulse width modulation comparators 116 and 118.

The measurement signal from the accelerometer 28 is impressed across the two ends of potentiometer 112. A common terminal of potentiometer 112 and the wiper arm are coupled as inputs to buffer amplifier 111 wherein potentiometer 112 controls the gain of the input signal to amplifier 111. The output of buffer amplifier 111 is coupled to a first input of error amplifier 109. A voltage feedback signal from power module section 18 is coupled as input to feedback amplifier 110 and the output of amplifier 110 is coupled to a second input of error amplifier 109. The output of error amplifier 109 is coupled to a first input of clipper 115. Amplifier 110 also provides scaling down of voltage feedback signal for proportionate scaling input to error amplifier 109. The two inputs to error amplifier 109 are summed with sufficient gain to insure a low distortion output waveform.

The system output current is sensed by a Hall effect sensor (not shown) in the main frame and transmitted to current sense amplifier 113. This low level current sense signal is inputted to the input of amplifier 113 wherein the low level signal is amplified and inputted to current limiting adjustment potentiometer 114. Potentiometer 114 may be set to a desired threshold level for clamping the error voltage by having the current threshold level inputted as a second input to clipper 115.

The output of the clipper 115 is coupled to a second input of comparator 116 and to a second input of comparator 118 through inverter 117. The error voltage is compared against the triangle by comparators 116 and 118 which creates the pulse-width modulated drive for power modules 37. Modulation limiter placed on the drive signal by modulation stop 119 which is coupled to the outputs to the two comparators 116 and 118 provides maximum amplitude limit on the drive signals. The output of modulation stop 119 is coupled to the input or dead time unit 120 which inserts a dead time into the switching to prevent one switch from turning on before its mate has turned off. The output of dead time unit 120 is coupled to the input of module drivers 121 and 122 which provide the necessary drive to generate drive A and drive B as drive signals to opto-couplers 81 and 82 of FIG. 4. Hence, drivers 121 and 122 control the switching of all th power modules. Modulation limiter 119 and dead time unit 120 may be of any prior art circuit well-known for such application.

Thus, a solid state power amplifier having a plurality of pluggable power modules and a single modulator for controlling these power modules has been described. Although the amplifiers and modulator of the present invention is used to drive a shaker, it is readily apparent that other electrical devices may be driven without departing from the spirit and scope of the present invention.

I claim:

1. A circuit for generating an amplified driving signal to drive an electrical device comprising:
   an oscillator generating a base signal having a first frequency;
   a wave-shaping network coupled to said oscillator for converting said base signal to a modulation signal, said wave-shaping network having adjusting means, wherein a shape of said modulation signal is selectively determined by said adjusting means;
   an error detection network for accepting a feedback signal from said electrical device and providing an error signal;
   a modulator coupled to said wave-shaping network and said error detection network for providing a pulse-width modulated (PWM) driving signal which is a combination of said modulation and error signals;
   a driver amplifier coupled to said modulator for amplifying said driving signal;
   whereby said device is electrically controlled by said circuit.

2. The circuit of claim 1, wherein said modulator further including a first comparator and a second comparator; said first comparator comparing said modulation signal to said error signal and providing a first half portion of said PWM driving signal; and said second comparator comparing said modulation signal to an inverse of said error signal and providing a second half portion of said PWM driving signal.

3. The circuit of claim 2, wherein said second half portion of said PWM driving signal is an inverse complement of said first half portion of said PWM driving signal.

4. The circuit of claim 3, wherein said error detection network for further detecting a voltage and current values of said device and providing said error signal such that said error signal limits said device voltage and current values to maximum values.

5. The circuit of claim 4, wherein said maximum device voltage and current values are adjustable.

6. The circuit of claim 1 or 5, further including a power amplifier coupled to said oscillator wherein said oscillator base signal providing a drive input of said power amplifier.

7. The circuit of claim 6, wherein said oscillator is a crystal oscillator having 3.58 MHz as said first frequency.

8. A circuit for generating an amplified driving signal to drive an electrical device comprising:
   an oscillator generating a square-wave signal having a first frequency;
   a triangle generator coupled to said oscillator for converting said square-wave signal to a triangular-wave signal; said triangle generator having adjustment means, wherein a pulse-width of said triangular-wave signal is selectively determined by said adjusting means, and said triangle generator having a constant current source to precisely produce said triangular-wave signal;
   an error detection network for accepting a feedback signal from said electrical device and providing an error signal;
   a modulator coupled to receive said triangular-wave signal and said error signal for comparing said two signals and generating a pulse-width modulated (PWM) square-wave signal, wherein pulse-width modulation is determined by said pulse-width of said triangular-wave signal;
   a driver amplifier coupled to said modulator for amplifying said PWM signal and providing said amplified driving signal;
   whereby said device is electrically controlled by said circuit.

9. The circuit of claim 8, wherein said modulator further including a first comparator and a second comparator; said first comparator comparing said triangular-wave signal to said error signal and providing a first half portion of said PWM signal; and said second comparator comparing said triangular-wave signal to an inverse of said error signal and providing a second half portion of said PWM signal.

10. The circuit of claim 9, wherein said second half portion of said PWM signal is an inverse complement of said first half portion of said PWM signal.

11. The circuit of claim 10, wherein said feedback signal to measure device response to said driving signal.

12. The circuit of claim 11, wherein a level of said feedback signal is adjustable.

13. The circuit of claim 12, wherein said modulator further including a limiter to limit said PWM signal to a maximum amplitude.

14. The circuit of claim 13, wherein said error detection network for further detecting a voltage and current values of said device and limiting each of said values to a maximum value by controlling a level of said error signal.

15. The circuit of claim 14, wherein said maximum values are adjustable.

16. The circuit of claim 15, wherein said oscillator further includinng a divider for dividing said square-wave signal from a first frequency to a second frequency, such that said second frequency is coupled to said triangle generator.

17. The circuit of claim 16, wherein said oscillator is a crystal oscillator.

18. The circuit of claim 17, further including a power amplifier coupled to said oscillator wherein said square-wave signal having said second frequency provides a drive input to said power amplifier.

19. The circuit of claim 18, wherein said first frequency is 3.58 MHz and said second frequency is 56 KHz.

20. The circuit of claim 19, wherein said triangle generator further including a capacitive integrator to generate said triangular-wave signal.

21. for generating an amplified driving signal to drive a vibration testing device comprising:
- a crystal oscillator generating a square-wave signal having a first frequency;
- a divider coupled to said oscillator for dividing said first frequency to a second frequency;
- a triangle generator coupled to said divider for converting said square-wave signal to a triangular-wave signal; said triangle generator having adjustment means, wherein a pulse-width of said triangular-wave signal is selectively determined by said adjusting means;
- an error detection means for accepting a feedback signal from said vibration testing device and providing an error signal, said feedback signal measuring the response of said vibration testing device to said driving signal;
- a modulator coupled to said triangular-wave signal and said error signal for providing a pulse-width modulated (PWM) driving signal which is a combination of said triangular-wave signal and said error signal;
- a limiter coupled to said modulator for limiting a maximum amplitude of said PWM signal;
- a driver amplifier coupled to said limiter for amplifying said PWM signal and providing said amplified driving signal;

whereby said vibration testing device is controlled.

22. The circuit of claim 21, wherein said modulator further including a first comparator and a second comparator; said first comparator comparing said triangular-wave signal to said error signal and providing a first half portion of said PWM signal; and said second comparator comparing said triangular-wave signal to an inverse of said error signal and providing a second half portion of said PWM signal which is an inverse complement of said first half portion.

23. The circuit of claim 22, wherein said error detection network for further detecting a voltage and current values of said device and limiting each of said values to a maximum value by controlling a level of said error signal.

24. The circuit of claim 23, further including a dead time network coupled in between said limiter and said driver amplifier for delaying each of said half portions.

25. The circuit of claim 24, further including a power amplifier coupled to said divider for amplifying said square-wave signal.

26. The circuit of claim 25, wherein said first frequency is 3.58 MHz and said second frequency is 56 KHz.

27. The circuit of claim 26, wherein said vibration testing device includes a shake table.

28. The circuit of claim 27, further including a plurality of protective devices for monitoring and protecting said shake table.

29. The circuit of claim 28, wherein said vibration testing device having an electronmagnetically driven shake table.

30. The circuit of claim 28, wherein said vibration testing device having an electro-pneumatic transducer to produce acoustically induced vibrations.

* * * * *

UNITED STATES PATENT AND TRADEMARK OFFICE
CERTIFICATE OF CORRECTION

PATENT NO. : 4,700,148
DATED : 10/13/87
INVENTOR(S) : Wayne Pauly

It is certified that error appears in the above-identified patent and that said Letters Patent are hereby corrected as shown below:

Column 2, line 1, change "bases" to --basis--;

line 4, change "inputed" to --inputted--.

Column 3, line 5, change "1" to --19--.

Column 5, line 38, change "switch" to --switches--;

line 40, change "couplier" to --coupler--;

line 56, change "switoh" to --switch--.

Column 6, line 6, insert after "and" --2--.

Column 9, claim 21, line 4, insert before "for" -- A circuit --.

Signed and Sealed this

Nineteenth Day of January, 1988

Attest:

DONALD J. QUIGG

*Attesting Officer*        *Commissioner of Patents and Trademarks*